US005927668A

United States Patent [19]
Cyrell

[11] Patent Number: 5,927,668
[45] Date of Patent: Jul. 27, 1999

[54] ADJUSTABLE FRAMING SUPPORT SYSTEM

[75] Inventor: Alexander Cyrell, Tempe, Ariz.

[73] Assignee: Omni Mount Systems, Inc., Phoenix, Ariz.

[21] Appl. No.: 08/579,868

[22] Filed: Dec. 28, 1995

[51] Int. Cl.[6] .......... A47B 81/06

[52] U.S. Cl. .......... 248/317; 248/316.1; 248/924; 248/917

[58] Field of Search .......... 248/317, 320, 248/323, 328, 326, 489, 917, 924, 274.1, 278.1, 279.1, 551, 316.1, 316.2, 316.4, 316.6, 223.41, 224.51, 244.61; 52/720.1, 734.1, 656.5, 656.6, 656.9; 40/783, 784; 269/108, 130, 42, 41, 109, 104, 131, 132

[56] References Cited

U.S. PATENT DOCUMENTS

| | | | |
|---|---|---|---|
| 2,204,493 | 6/1940 | Henry | 52/720.1 |
| 2,611,949 | 9/1952 | Wanamaker | 269/130 |
| 2,831,808 | 4/1958 | Esseff et al. | 248/223.41 X |
| 3,429,602 | 2/1969 | Dirilgen | 52/656.9 X |
| 3,451,153 | 6/1969 | Dohanyos | 40/783 X |
| 3,784,043 | 1/1974 | Presnick | 52/656.9 X |
| 4,027,866 | 6/1977 | Ruggiero | 269/41 |
| 4,031,796 | 6/1977 | Wilkes | 248/224.61 X |
| 4,074,811 | 2/1978 | Filak | 211/191 |
| 4,356,648 | 11/1982 | Beaulieu | 40/783 |
| 4,450,655 | 5/1984 | Rosenthal et al. | 248/223.41 X |
| 4,831,804 | 5/1989 | Sayer | 52/656.5 X |
| 4,924,649 | 5/1990 | Taylor | 52/656 |
| 4,997,155 | 3/1991 | Reuter et al. | 248/278.1 |
| 5,064,161 | 11/1991 | Anderson | 248/317 |
| 5,161,789 | 11/1992 | Rogers | 269/108 X |
| 5,165,644 | 11/1992 | Allen | 248/285 |
| 5,310,152 | 5/1994 | O'Neill | 248/329 |
| 5,393,025 | 2/1995 | Franklin | 248/917 X |
| 5,400,993 | 3/1995 | Hamilton | 248/278 |
| 5,411,244 | 5/1995 | Turner | 269/109 X |
| 5,538,214 | 7/1996 | Sinila | 248/278.1 |

FOREIGN PATENT DOCUMENTS

| | | | |
|---|---|---|---|
| 181133 | 2/1907 | Germany | 269/108 |
| 457013 | 3/1928 | Germany | 269/108 |
| 2231995 | 11/1990 | United Kingdom . | |

*Primary Examiner*—Ramon O. Ramirez
*Assistant Examiner*—Stephen S. Wentsler
*Attorney, Agent, or Firm*—Gallagher & Kennedy

[57] ABSTRACT

A mounting system for mounting an object includes a plurality of framing members having a body portion with at least one continuous slot running along the length of the framing member. A plurality of connecting members for connecting adjacent framing members are provided. A plurality of cornerpieces each having a first and second section at substantially right angles to each other are also provided. The cornerpieces have an inner and an outer surface with a plastic material of high coefficient of friction located at least partially over the inner surface, each corner piece being located, in use, with its outer surface adjacent a corner connection between adjacent framing members and its inner surface with the material high coefficient of friction thereon adapted, in use, to engage the object to be mounted. A corner cover connecting to adjacent framing members to cover the join and any exposed connecting piece. The framing member and connecting piece are slidable relative to each other so as to form a frame of desired shape and configuration. The system further comprises at least one cable extending through the slots in the framing members so as to hold the framing members and connecting members securely and firmly relative to each other when the cable is placed in tension.

14 Claims, 14 Drawing Sheets

138 14 22 12 12a 16a 16b 12b 18 16c 20 12d 22 12c 16d

ADJUSTABLE FRAMING SUPPORT SYSTEM

FIELD AND BACKGROUND OF THE INVENTION

This invention relates to apparatus and devices for mounting objects. Particularly, the invention is directed towards such mounting apparatus when used in a residential, industrial or commercial application for the purpose of mounting objects such as television sets, computer monitors, speakers, cameras, VCRs and other types of electronic equipment. However, it is to be noted that the apparatus for mounting objects which forms the subject of this invention is not confined for use with the objects mentioned above.

In order to take advantage of limited space availability, special acoustic requirements, or design efficiency, it is useful to provide mounting systems to permit various objects to be placed in a convenient location. Thus, in conventional residential "media centers", computer monitors and television sets are best placed in certain locations, while, for example, speakers may be placed apart, and connected to walls and ceilings for maximum acoustic effect and space-saving efficiency. The inventor also addresses multiple speaker "home theater" residential audio/visual systems.

The present invention provides an apparatus and system for mounting objects of various types, to permit optimal utilization of space availablity, adjustability of the object's optimal viewing and/or listening angle, and otherwise achieve aesthetic and design effects which may be tailored to the user's needs.

SUMMARY OF THE INVENTION

According to one aspect of the invention, there is provided an apparatus for mounting an object, the apparatus comprising: an elongated framing member having a body portion and a depending side wall extending down each side of the body portion; and at least one continuous slot in the framing member.

Preferably, the body portion is arcuate, and has an inner and outer surface, and the framing member has a pair of slots, each slot being located near a depending side wall of the framing member.

The apparatus may further comprise a continuous flange running down the length of the framing member, the flange being substantially parallel to the body portion and defining a continuous groove between the flange and the body portion. The continuous groove may have a widened base portion, i.e., be essentially T-shaped in cross-section.

Preferably, the slotted member is T-shaped, and comprises a narrower entry channel from an outer surface of the body portion, and a wider base channel in communication with the entry channel. The T-shaped slot may be defined by the body portion, side wall and a slot wall, the slot wall extending between the body portion and the side wall.

The apparatus may further comprise at least one connecting piece or member for connecting two framing members to each other in a desired orientation The connecting piece conveniently comprises a first portion and a second portion, each of the first and second portions having a lateral tongue on each side thereof, the lateral tongue of the first portion being received in the continuous grooves of a first framing member, and the lateral tongue of the second portion being received in the continuous grooves a second framing member. The first and second portions of the connecting piece may be located at an angle relative to each other so as to provide a predetermined angle between the first and second framing members. Preferably, the connecting piece is corrugated in cross-section so as to provide at least a continuous trough along the length thereof adjacent the lateral tongues.

The apparatus may further comprise an intermediate piece located between the framing member and the object, the intermediate piece having an inner and outer surface wherein the inner surface incorporates a material of a high coefficient of friction. The intermediate piece may be a cornerpiece having first and second sections which are substantially at right angles to each other.

The apparatus may further comprise a corner cover, the corner cover being adapted to cover the connecting member and at least ends of adjacent framing members held together by the connecting member. The corner cover may comprise a body section and depending side wall sections, the depending side wall section including a plurality of tab members for facilitating a snap-fit connection of the corner cover with one or more framing members.

Preferably, the apparatus further comprises at lest one cable, the cable extending through the continuous slot of the framing members and the connecting pieces, the cable being tightened by a tensioning apparatus about a frame defined by framing members and connecting pieces and holding the framing members and connecting pieces firmly in place. Preferably, the tensioning apparatus includes compression springs that permit minor elongation of the cable when in the fixed position.

According to another aspect of the invention, there is provided a mounting system for mounting an object, the system comprising: a plurality of elongated framing members each having a body portion and depending side walls, with at least one continuous slot running along the length of the framing member, the framing member having an inwardly directed and continuous flange running along the length thereof, the flange and the body portion of the framing member defining a groove; a plurality of connecting members for connecting adjacent framing members, the connecting members each having a first and second portion and lateral tongues on each of the first and second portions, the connecting pieces being at least partially corrugated in cross-section and defining at least a pair of troughs each adjacent a lateral tongue, the lateral tongues of the connecting member being received within the grooves of adjacent framing members so as to connect adjacent framing members at predetermined orientations; a plurality of cornerpieces each having a first and second section at substantially right angles to each other, the cornerpiece having an inner and an outer surface with a plastic material of high coefficient of friction located at least partially over the inner surface, each corner piece being located, in use, with its outer surface adjacent a corner connection between adjacent framing members and its inner surface with the material of high coefficient of friction thereon adapted, in use, to engage the object to be mounted; and a corner cover for connection to adjacent framing members to cover the join and any exposed connecting piece; wherein the framing members and connecting pieces are slidably connected relative to each other so as to form an adjustable frame of desired shape and configuration, the mounting system further comprising at least one cable extending through the framing member and connecting pieces so as to securely hold the framing members and connecting pieces securely and firmly relative to each other, the cable being located in the continuous slot of the framing member and in a trough defined in the connecting pieces, the slots of the framing members being continuous and in registry with a trough in the joining connecting pieces.

DETAILED DESCRIPTION OF THE PREFERRED EMBODIMENTS

Figure 5:
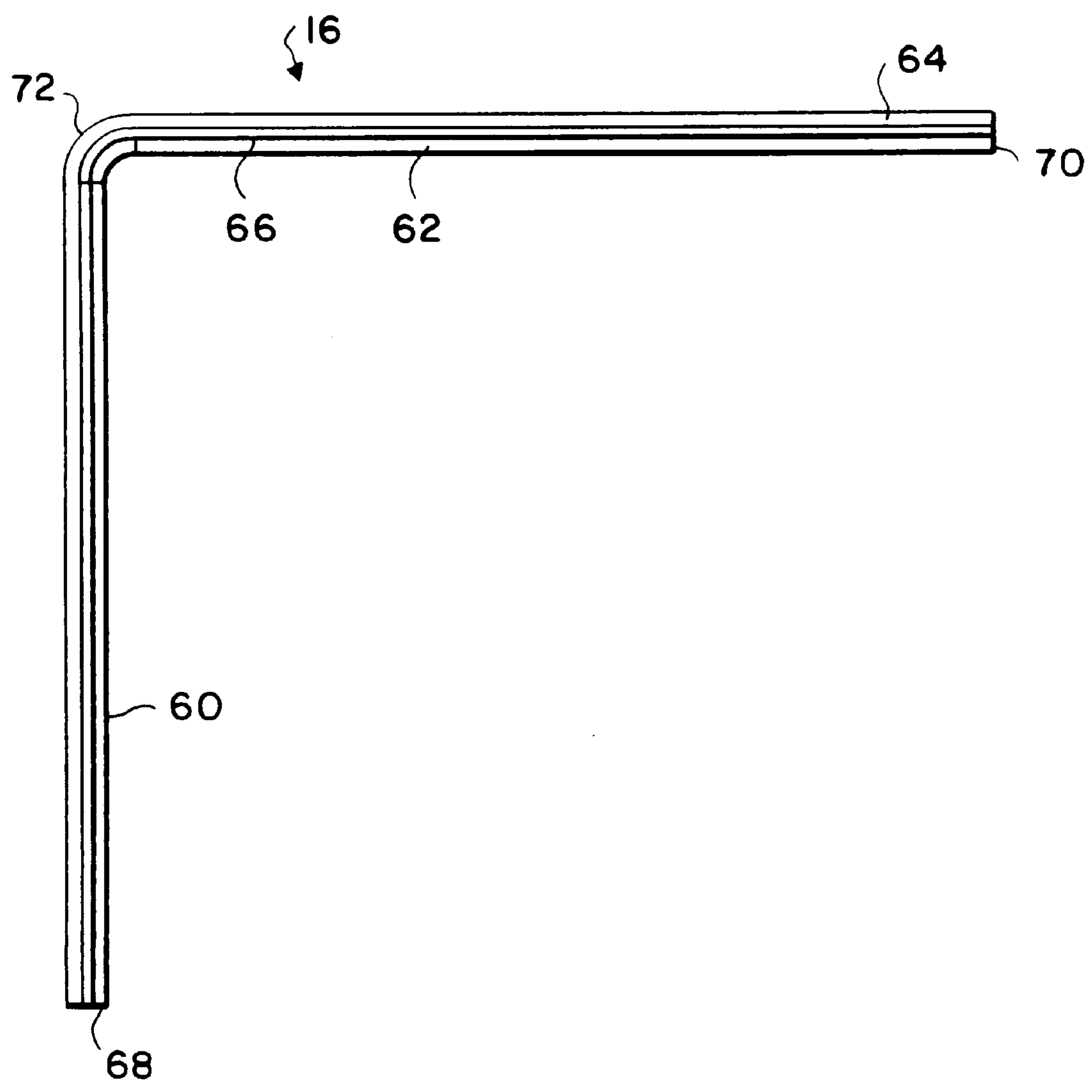
FIG. 5 is a side view of a connecting piece or member used to connect framing members as shown in FIG. 1.

As will be described below with full reference to the attached drawings, the present invention relates to an apparatus for mounting objects, as well as a mounting system. Generally, the apparatus for mounting objects comprises a framing member 12, best illustrated in FIGS. 1 and 2 of the drawings. The mounting system includes a mounting frame 14, the mounting frame 14 including at least two framing members 12, joined together by a connecting pieces or member 16, best shown in FIG. 5, a cable 18, a corner piece 20, best shown in FIG. 7 and a corner cover 22, best shown in FIGS. 9 and 10.

Figure 1:
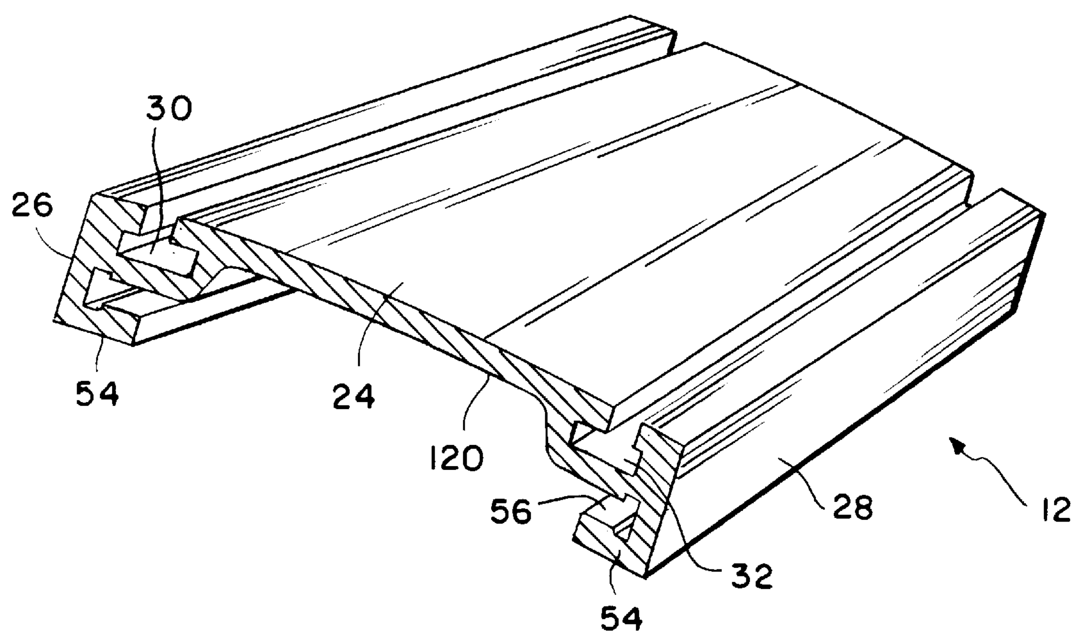
FIG. 1 is a perspective view of a framing member forming part of the mounting apparatus of the invention.
Figure 2:
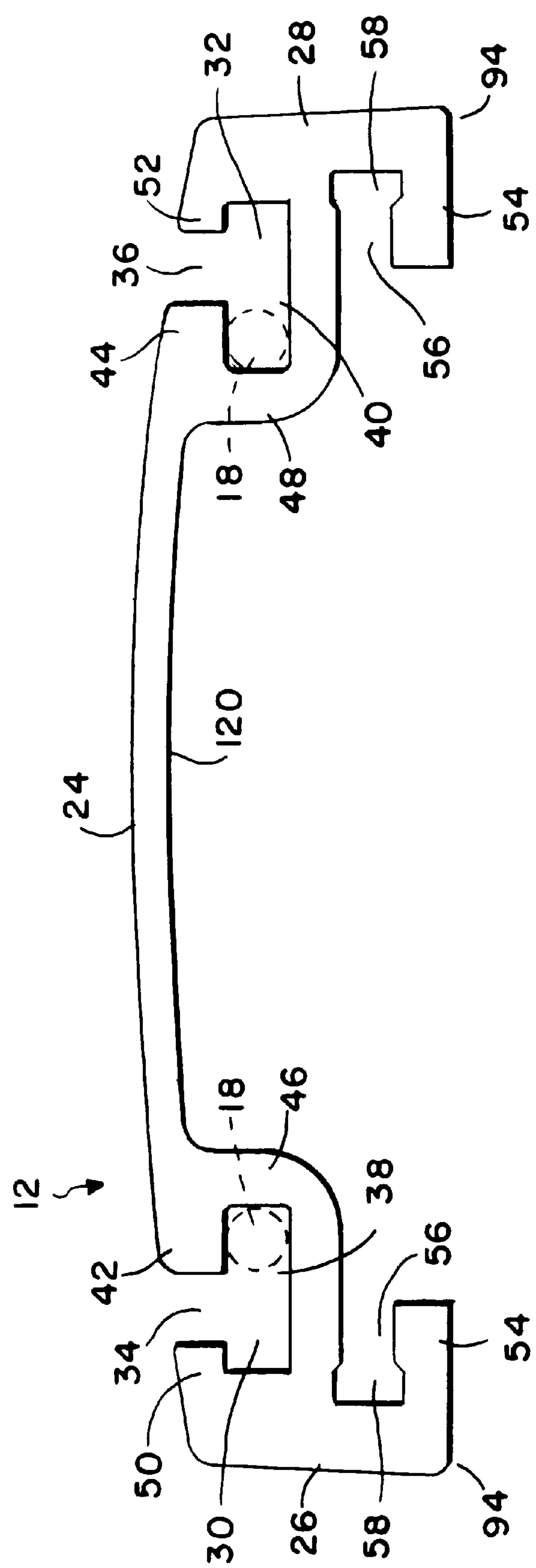
FIG. 2 is an end view of the framing member of FIG. 1.
Figure 3:
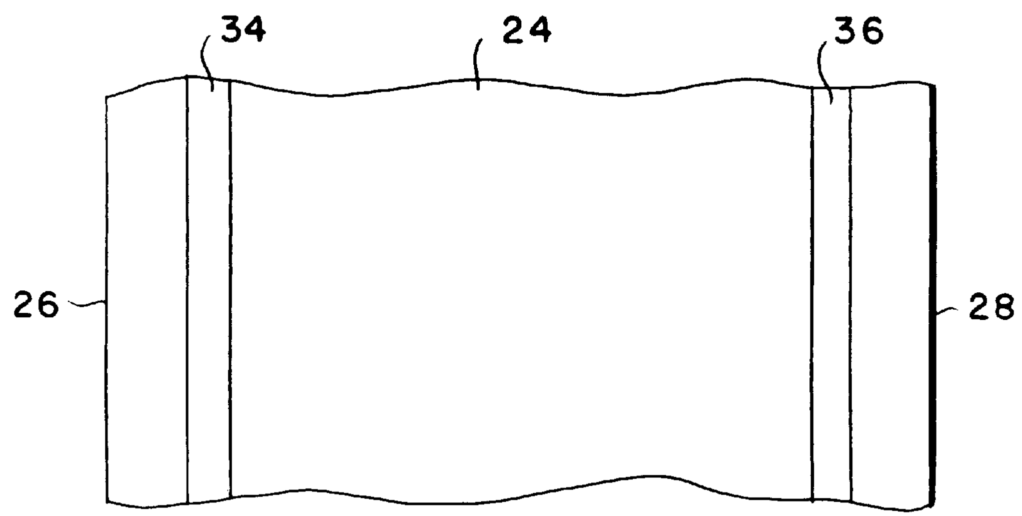
FIG. 3 is a plan view of the framing member shown in FIG. 1.
Figure 4:
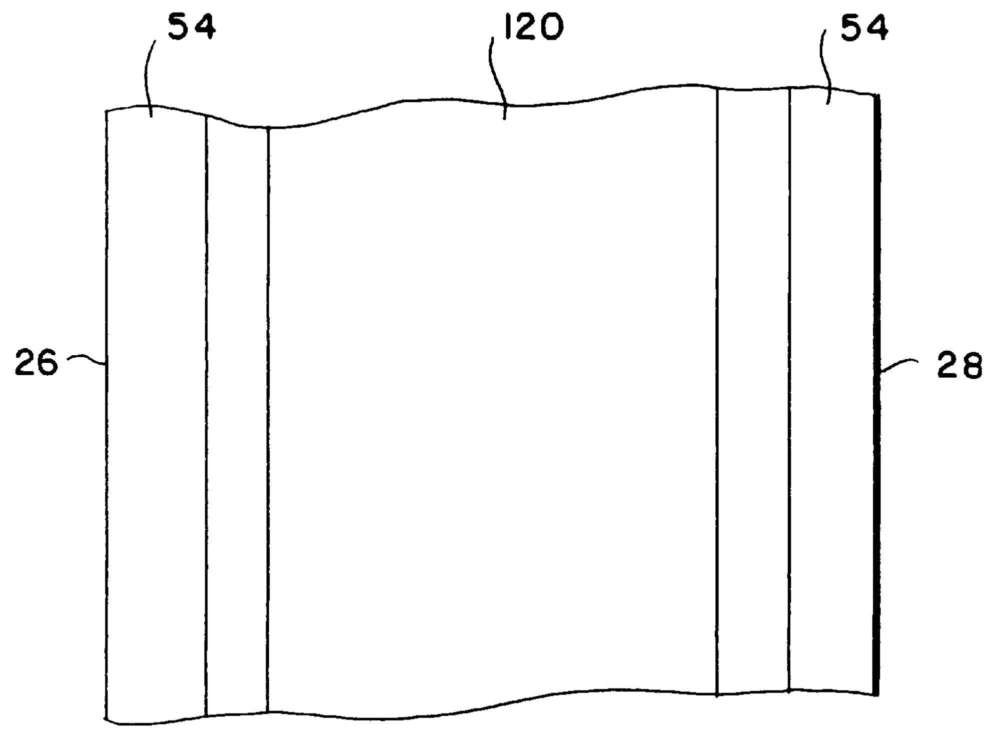
FIG. 4 is a bottom view of the framing member shown in FIG. 1.

With particular reference to FIGS. 1–3, there is shown a framing member 12 having a body portion 24, and two depending side walls 26 and 28. The body portion 24 is slightly convex.

At each end of the body portion 24 there is located a continuous T-shaped slot 30 and 32, each slot having an entry channel 34 and 36 which leads into the base slot 38 and 40. Each T-shaped slot 32 is therefore defined by a body portion projection 42 and 44, a slot wall 46 and 48, and a part of the side wall 26 and 28, each of the side walls having a side wall projection 50 and 52. The slot walls 46 and 48 recess inwardly towards the center making the T-shaped slot asymetrical, thus accomodating clearance to recess, out-of-view, cable 18.

Each side wall 26, 28 further comprises an inwardly extending flange 54 which, with the remainder of the side wall 28 and the slot wall 48 defines a groove 56 which is continuous and runs down the entire the length of the framing member 12. The groove 56 has a widened end 58 at the closed end thereof.

As will be described more fully below, a plurality of framing members 12 may be connected to each other so as to define a frame which is adjustable in size, and may assume just about any shape or configuration which may be necessary depending upon the object which the mounting frame 14 is intended to support. Any two adjacent framing members 12 may be connected together by a connecting pieces or member 16, best shown in FIGS. 5 and 6 of the drawings. The connecting piece or member 16 shown in FIG. 5 has a first portion 60 and a second portion 62, the first and second portions being at substantially right angles to each other. However, it will be appreciated that the connecting pieces or member 16 may have first and second portions which are other than at right angles to each other, depending on the shape of the frame that is to be constructed. Furthermore, the connecting member 16 may simply comprise a substantially plane or straight piece; in other words, such a connecting member has the first and second portions at 180° to each other. In this latter instance, the connecting member 16 will join a pair of adjacent framing members 12 where the framing members are intended to be continuous, and not to define an angle therebetween.

The connecting piece 16 has a defined width for a particular framing member 12, and comprises a tongue 64 at each end thereof. The tongue 64 at each end of the connecting member 16 is adapted to be received in the groove 56 of the framing member 12. Thus, the connecting piece will be sufficiently wide so that it extends at least into the grooves 56 of the framing member 12 but would not be wider than the distance between the side walls 26 and 28 of the framing member.

Between the tongues, the connecting member is preferably comprised of a series of corrugations 66, which impart additional strength to the connecting member, and limit the amount by which the connecting member may bend or give when under a load.

The first portion 60 of the connecting member 16 has a first end 68, while the second portion 62 of the connecting member 16 has a second end 70. When connecting the connecting member 16 to a framing member 12, the first end 68 is inserted into the grooves 56 and space extending therebetween of the framing member 12. Since the grooves 56 are continuous, the first portion 60 of the connecting piece 16 slides down along the grooves 56, and is able to do so at least until the bend 72 in the connecting member 16. As will be described more fully below, a mounting frame 14 constructed between the framing members 12 and connecting members 16 joining such framing members 12 is variable in size, and the extent to which the first and second portions 60 and 62 of the connecting members 16 extend longitudinally between the continuous grooves 56 of the framing member 12 will in large part depend upon the size of the mounting frame 14 to be constructed, which is in turn dependent on the article or object which the mounting frame 14 is intended to support.

From the above description, it will be appreciated that a plurality of framing members 12, interconnected by connecting members 16 as described above, gives rise to a mounting frame 14 which may be of any desired size or configuration.

Figure 8:
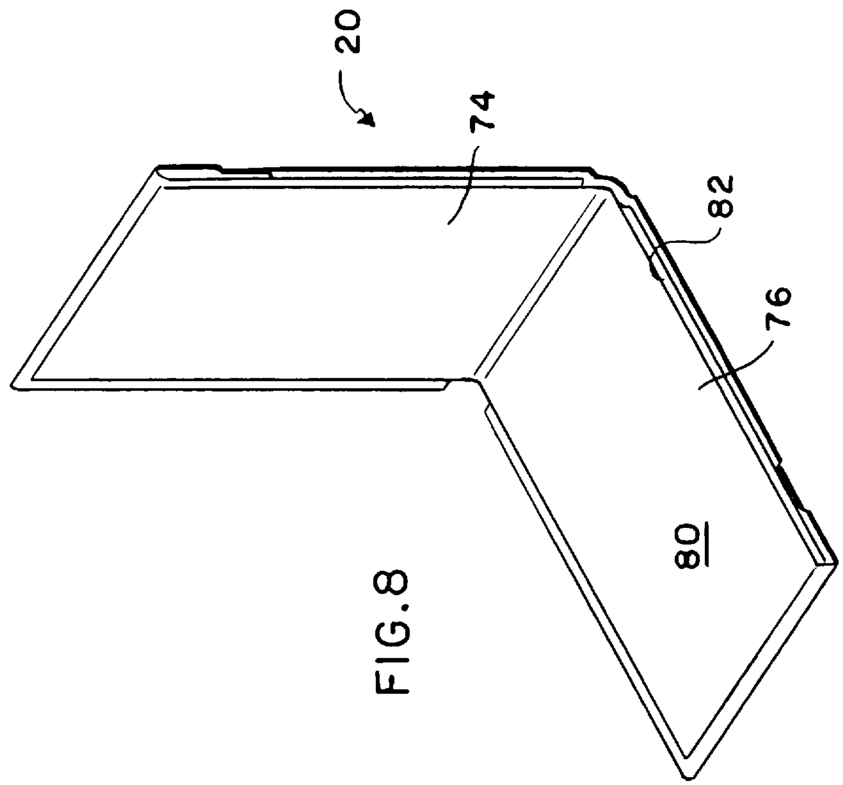
FIG. 8 is a perspective outside view of a corner piece of the mounting system of the invention.
Figure 7:
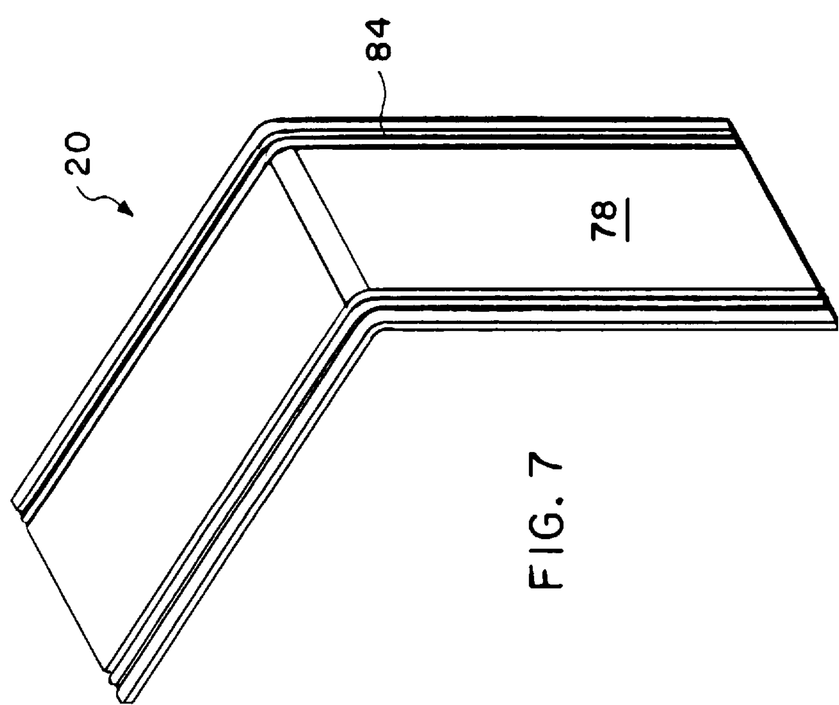
FIG. 7 is a perspective inside view of a corner piece of the mounting system of the invention.

In FIGS. 7 and 8, there is shown a cornerpiece 20 comprising a pair of flat surfaces 74 and 76 at substantially right angles to each other. Each flat surface 74 and 76 has an outer side 78, best shown in FIG. 7, and an inner side 80 which can be seen in FIG. 8.

On the inner side 80 of each of the flat surfaces 74 and 76 there is provided a flat hybrid synthetic/rubber or rubber-like material 82 which typically has a very high coefficient of friction. A suitable material is available under the trade name Santoprene (among others). The outer side 78 of the cornerpiece has running therealong a series of rib-like projections 84 extending from one end of the flat surface 74 to the opposite end of the flat surface 76.

In use, as will be described further below, the cornerpiece 20 is intended to be located between the pair of adjacently connected framing members 12 and the object or article which is mount mounted. The outer side 78 is, at least along some of its surface area, applied to a pair of adjacent framing members 12, while the inner side 80, and particularly the rubber-like material 82 thereof, is in contact with the object or article to be mounted. As the mounting frame 14 is tightened, to be discussed further below, the cornerpiece 20 becomes firmly wedged and compressed between the mounting frame 14 and the object to be assembled. The rubber-like material 82, with the high coefficient of friction, prevents slipping or sliding of the article relative to the cornerpiece 20, especially when the cornerpiece 20 is pushed against the object or article with some force. On the outer side 78 of the cornerpiece 20, the rib-like projections 84 facilitate a firm connection between the cornerpiece 20 and adjacent framing members (12) to further ensure that no slipping takes place.

Figures 9, 10:
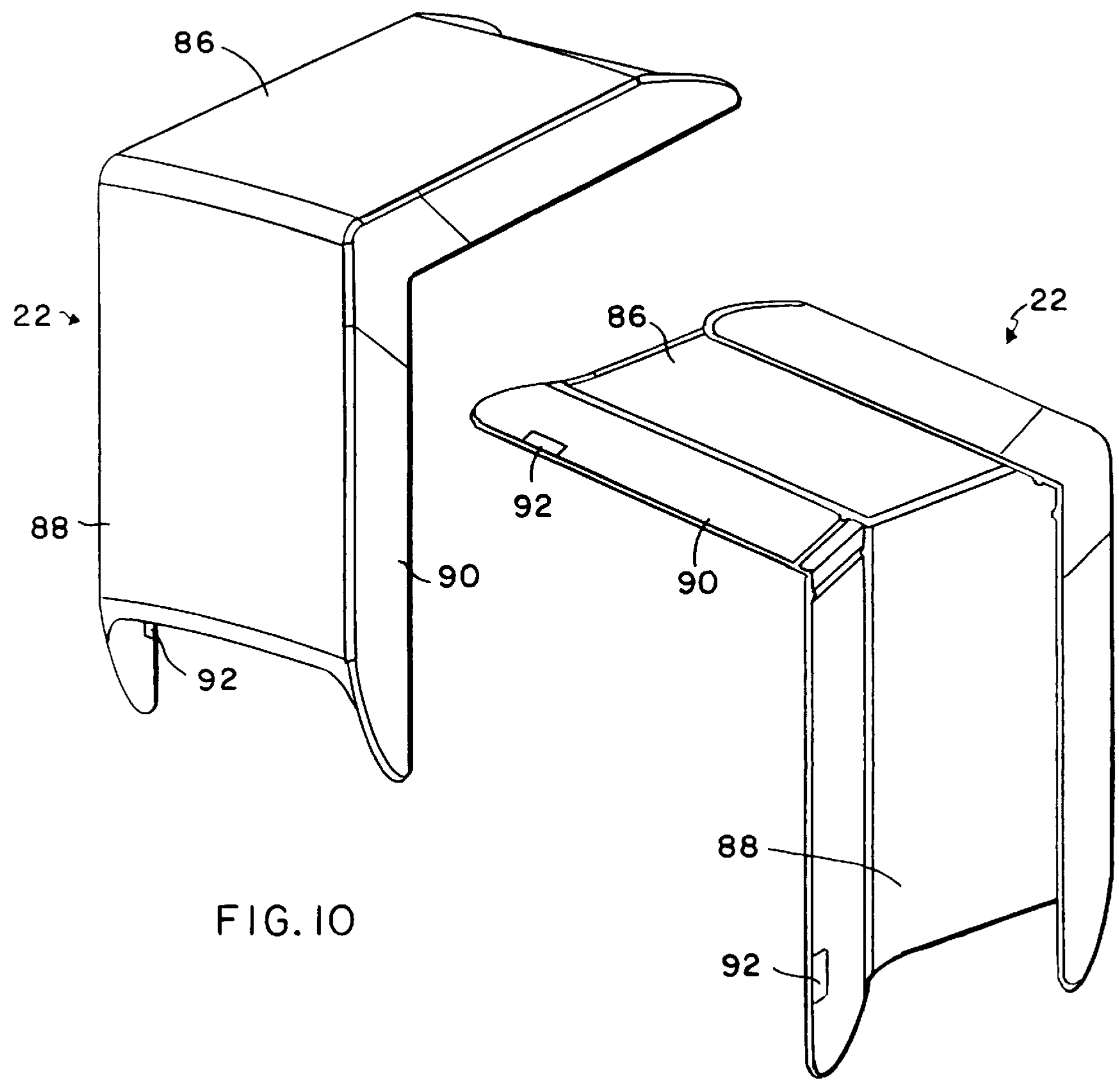
FIG. 9 is a perspective view of the outer side of a corner cover of the mounting system of the invention.
FIG. 10 is a perspective view of the inner side of a corner cover shown in FIG. 9.
Figure 11:
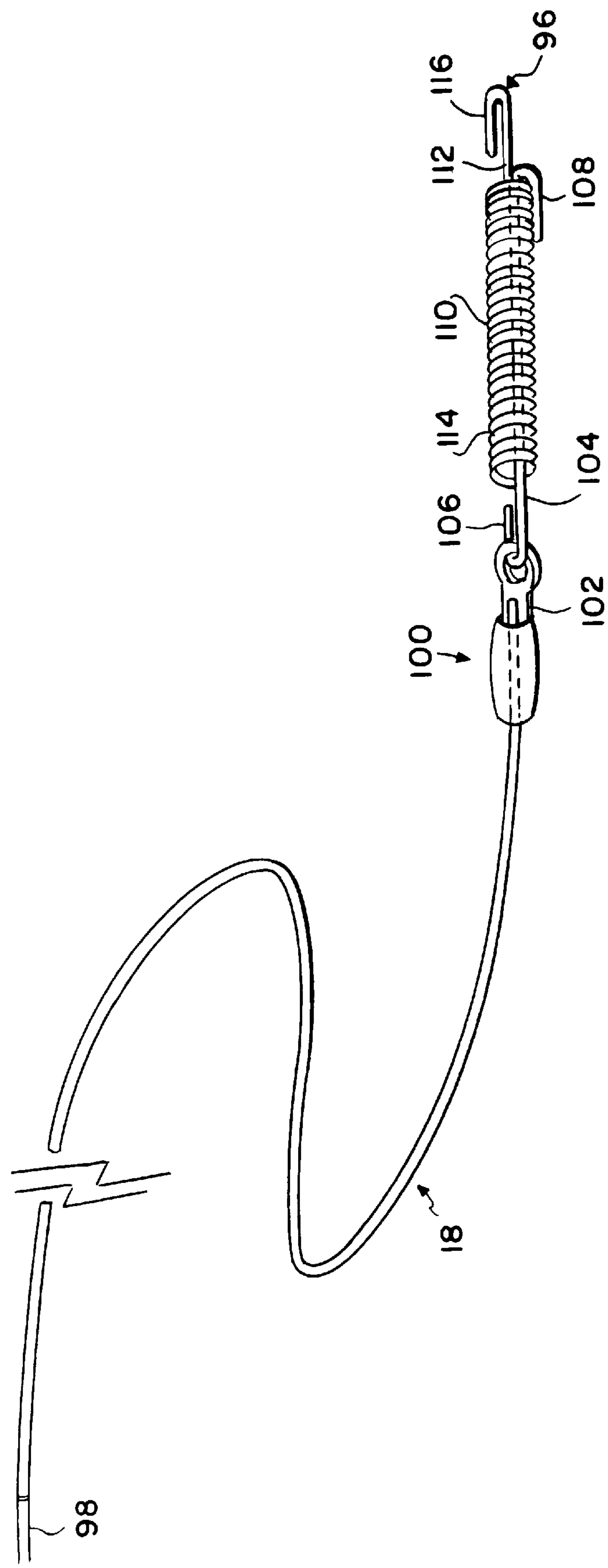
FIG. 11 is a view of a cable of the mounting system.

With reference to FIGS. 9 and 10, there is shown a corner cover 22 which, in the fully assembled mounting frame 14, essentially has an aesthetic or design function, and covers up the joined ends of the framing member 12 and the cornerpiece 20. The corner cover 22 has a pair of first and second walls 86 and 88 respectively, each of the walls 86 and 88 having a depending side wall 90. At appropriate locations on these side walls 90, a number of tabs 92 are provided so that the corner cover 22 can be attached in a slide-on and snap-fit fashion to the framing members 12. The tabs 92 are located so as to snap behind side walls 26 and 28 at tab-connecting point 94 shown, for example, in FIG. 2 of the drawings. While the tabs 92 constitute a secure fit, it is to be noted that they can also be removed since the cover corner 22 is generally comprised of a plastic material and can be sufficiently bent to remove the corner cover 22 should access or disassembly become necessary.

Figure 14:
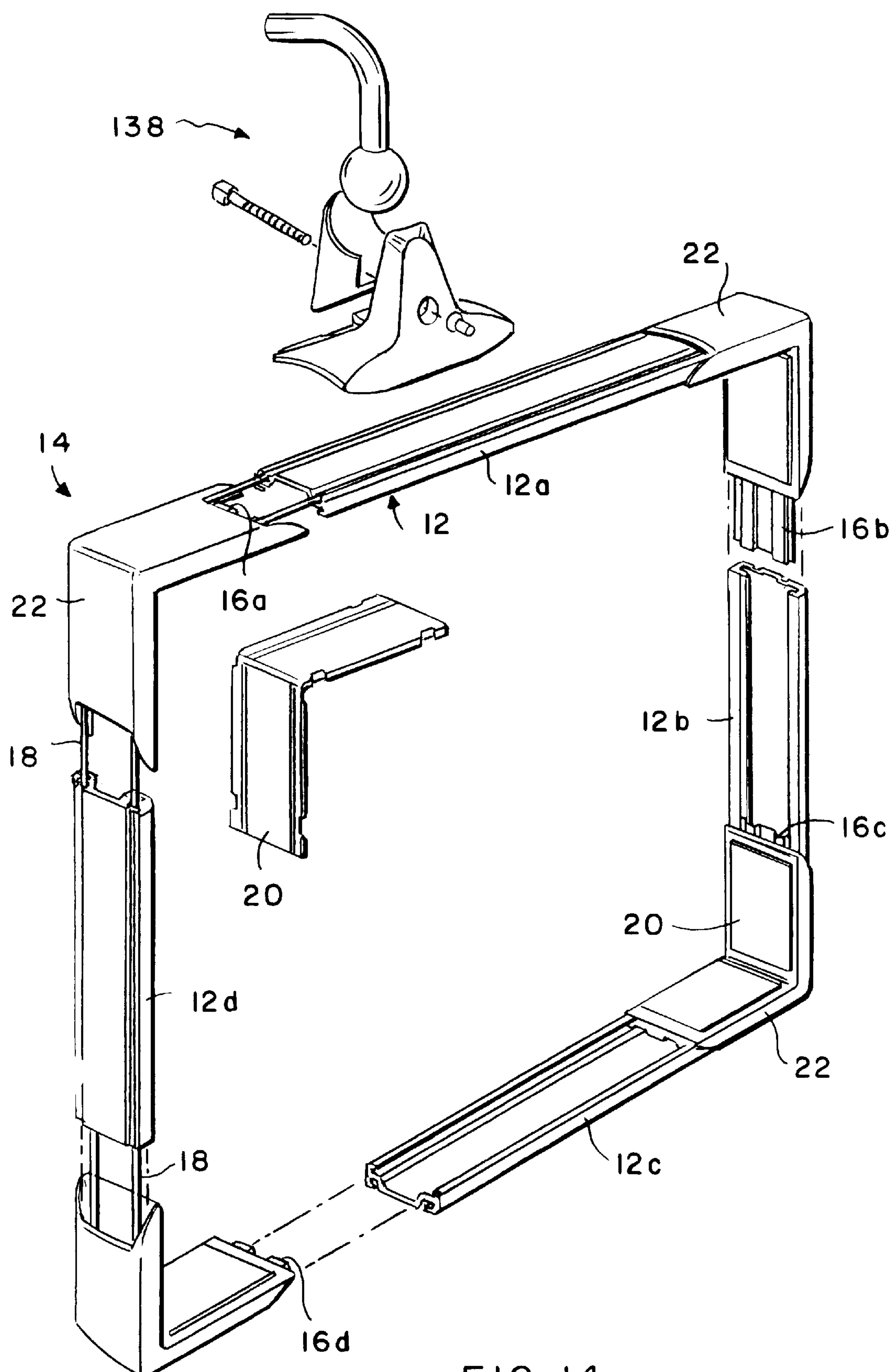
FIG. 14 is a perspective view, partially exploded, of a mounting system of the invention.

The various components of the system of the present invention can be assembled to form a mounting frame 14 generally shown in FIG. 14 of the drawings. With reference to FIG. 14, four framing members 12*a*, 12*b*, 12*c* and 12*d* are arranged with respect to each other so as to form a rectangle. In this particular instance, the desired size of the rectangle would be used to hold a monitor for a computer or a television set. Of course, the various framing members 12 can be arranged to form any desired shape or configuration, including an annular shape and configuration according to the article to be mounted.

With the framing members 12*a*, 12*b*, 12*c* and 12*d* in a substantially rectangular form, four connecting pieces or members 16*a*, 16*b*, 16*c* and 16*d* are used to connect the framing members 12*a*–12*d*. Thus, connecting piece 16*a* connects at right angles to each other the framing members 12*a* and 12*d*; connecting piece 16*d* connects the framing members 12*d* and 12*c* together at substantially right angles to each other; connecting piece 16*c* connects together mounting members 12*c* and 12*b* at substantially right angles to each other; and connecting piece 16*b* connects together the framing members 12*a* and 12*b* at substantially right angle to each other. It will be appreciated that the connecting members 16*a*–16*d* are capable of sliding movement within the continuous grooves 56 of their associated forming members 12*a*14 12*d* so that, at least at this stage, there is some flexibility with respect to the size of the rectangle which the various framing members 12*a*–12*d* and connecting members 16*a*–16*d* may define. Furthermore, the extent of the flexibility can be varied according to the lengths of the first and second portions 60 and 62 of the connecting members 16. The longer the first and second portions 61 and 62 are, the more such first and second portions 60 and 62 may extend outside the track defined by the grooves 56 on the framing member 12, and the larger the rectangle defined by the various components may be. Range of movement may be defined and limited aesthetically by the length of the walls 86 and 88 of the corner cover. However the framing system would still remain functionally operative if the connecting member end became visible.

In order to hold the framing members 12*a*–12*d* and the connecting members 16*a*–16*d* in position, a cable 18 extends through and/or within each of the frame members 12*a*–12*d* and connecting members 16*a*–16*d*. In this regard, the slot base 38 and 40 of the continuous T-shaped slots 30 and 32 are adapted to receive the cable 18. Thus, the cable is inserted into the T-shaped slot through the entry channels 34 and 36, and thereafter moved into the inner portion of the base slots 38 and 40 respectively. With reference to FIG. 2, the position of the cable 18 is shown in phantom lines in the base slots 38 and 40 of the T-shaped slots 30 and 32.

Figure 6:
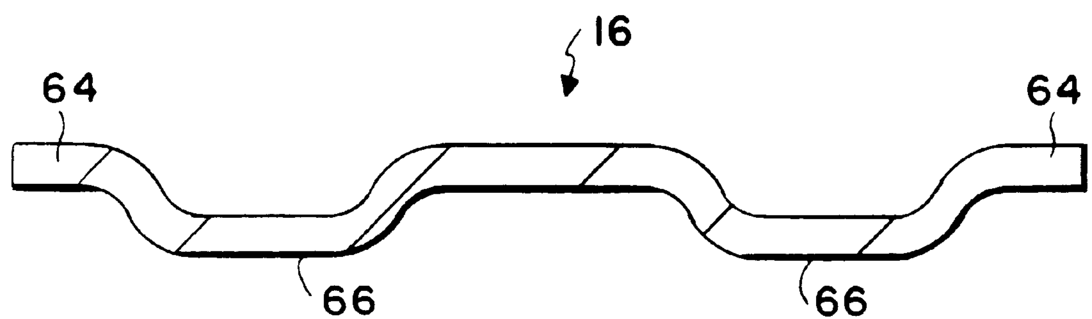
FIG. 6 is an end view of the connecting pieces or member shown in FIG. 5.

The cable 18 extends through the base slot 38 and 40 of the T-shaped slots 30 and 32 of each of the framing members 12*a*–12*d*, and then passes over the outer side of each connecting piece 16*a*–16*d*. It is prevented from any substantial movement as it passes over each connecting piece 16a-16d by virtue of the corrugations 66. With reference to FIG. 6, it will be seen that the corrugations 66 provide two troughs, one on each side of the connecting piece 16, and each trough is designed to receive the cable 18. The trough offers a path for the cable 18 which continues off from the base slots 38 and 40. The trough also serves to initially position, and maintain the position of, the cable 18 in the location allocated therefor.

The cable 18 has a first end 96 and a second end 98 which joins to the first end 96 in any suitable matter. Below, a description of two embodiments of the cable connection and tensioning apparatus which may be used in accordance with this invention is described (see FIGS. 12 and 13).

Between the first end 96 and the second end 98 on the cable 18, there is preferably provided a cable tensioning apparatus 100. The use of a cable tensioning apparatus means is preferable since the cable can, over time, slip or loosen. In addition, it is desirable that there be at least some small amount of "play" in the length of the cable so that the mounting frame 14 can withstand certain movements without compromising the entire system. In addition, it is desirable that the cable have constant tension provided by the force of the compression on spring 110 to eliminate the potential for slippage or loosening over time. The compression spring also provides additional travel, essential to facilitate adequate travel during tensioning.

In this embodiment, the tensioning apparatus 100 may include a ring clamp 102 near the first end 96 of the cable 18. A first tie 104 with a hook 106 and 108 at each end thereof is provided. The hook 106 engages the ring clamp 102, while the hook, 108 extends through a compression spring 110, around which it attaches. A second tie 112, also having a hook 114 and 116 at each end is provided. The hook 114 of the second tie 112 extends through and around the compression spring 110, while the hook 116 on the second tie 112 is available for connection to the second end 98 of the cable 18. Alternatively, the first and second ends 96 and 98 of the cable 18 may be attached in a fixed manner to a part of the mounting frame.

In assembling the mounting frame 14 around an object to be mounted, the framing members 12*a*–12*d* and connecting piece or members 16*a*–16*d* are assembled with respect to each other as shown in FIG. 14, and two cables are threaded through the framing members 12*a*–12*d* and connecting members 16*a*–16*d* as described above. The cable is held loosely, so that the area defined by the mounting frame 14 is slightly larger than the object to be mounted. The tensioning means 100 is intended to incorporate two independently functioning cable assemblies, either one of which will support the object at the maximum rated load, should one cable assembly not operate at any time.

At this time, a cornerpiece 20 is placed at each of the four corners of the object to be mounted. The rubber-like material 82 is permanently affixed to the cornerpiece 20. Each cornerpiece 20, mounted at a corner of the object, will remain in contact therewith and is unlikely to slip because of the high coefficient of friction created by the rubber-like material 82. With each cornerpiece in position, the object and mounting frame 14 are brought into registry with each other so that the mounting frame surrounds the object at those points where the connecting members are located. In this position, the mounting frame 14 is ready to be tightened and secured so that the object is firmly held therein. To this end, the cable is tightened drawing the framing members 12*a*–12*d* and connecting members 16*a*–16*d* more closely and more tightly together, and bringing compressive pressure on the object through surface contact with the rubber-like material 82 on the cornerpieces 20. When the cable 18 has been sufficiently tightened, the cornerpieces 20 and rubber-like material 82 will be firmly wedged between the object being mounted and the mounting frame 14 defined by the framing members 12*a*–12*d* and connecting members 16*a*–16*d*. When sufficient tightening has taken place, the ends of the cable 18 are secured so that further movement of the cable is not permitted. As mentioned above, a minor movement of the cable will be permissible if a spring 110 is used as part of a tensioning means 100, but this movement will be insufficient to permit the amount of expansion necessary to allow the mounted object to fall out of the mounting frame 14. The object, such as a television monitor, therefore now has a mounting frame 14 securely tightened about its perimeter. The mounting frame, when used to mount, for example, a television monitor, is intended to be positioned in line with the television monitor's center of gravity situated in almost all cases at the very front of the television monitor enclosure.

At this point, a corner cover 22 may be placed on and snapped into position at each corner so as to cover the join between the adjacent framing members 12 and to cover the particular connecting piece 16. The corner cover 22 thus provides an appealing appearance and finishes off, from an aesthetic point of view, the mounting frame 14. The corner covers 22 have a snap-fit connection to the frame member 12, with the tabs 92 of the corner cover 22 fitting around the tab connecting point 94 of the framing member 12. The corner cover 22 can be easily removed, being made of plastic material, for appropriate adjustment or disassembly of the mounting frame 14 as necessary. The entire mounting frame is intended to present a low, unobtrusive profile in relation to the object or device to be mounted.

The framing members 12 and connecting members 16 are generally comprised of aluminum or steel, particularly where the object to be mounted is heavy. For smaller, lightweight objects, these components may be comprised of strong plastic such as polyurethane and/or polycarbonates.

Figure 12:
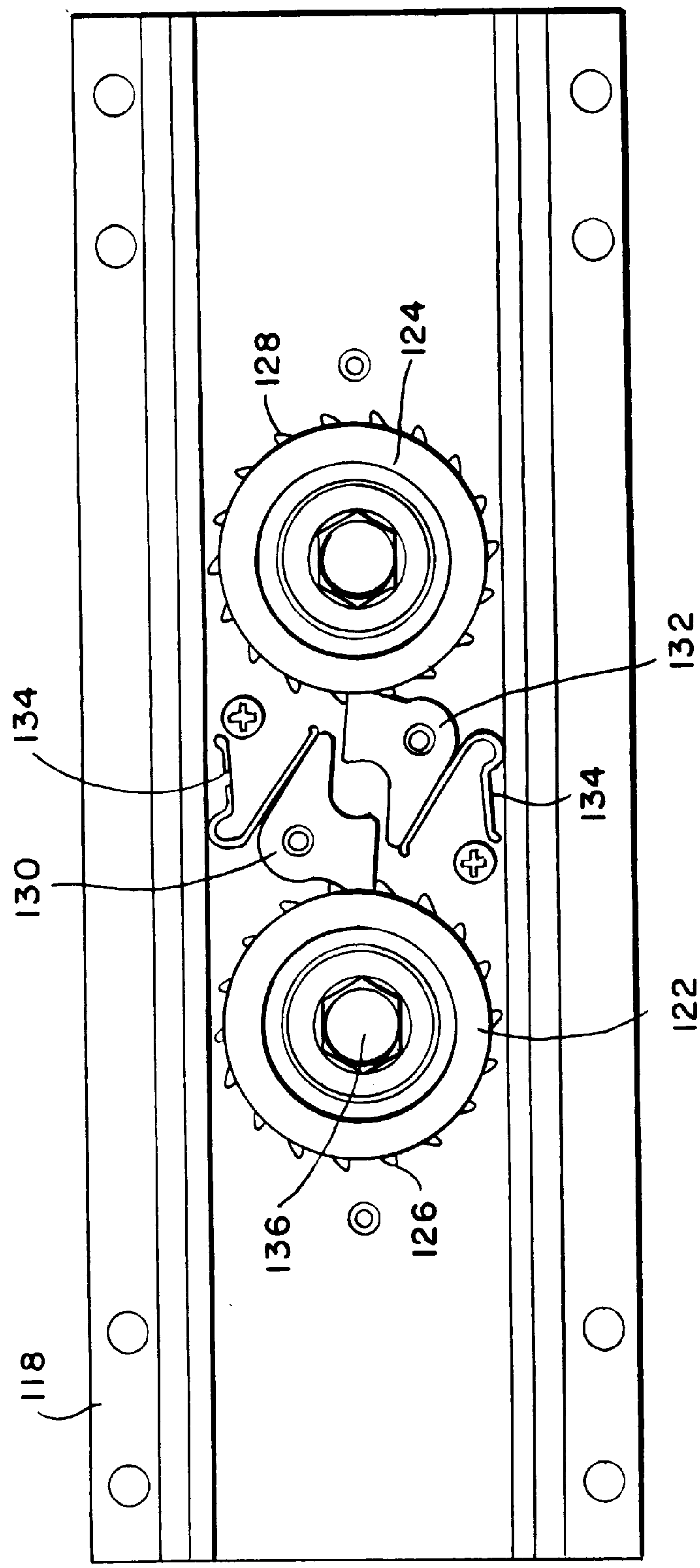
FIG. 12 is a plan view of a first embodiment of a cable tensioning apparatus of the mounting system of the invention.

FIG. 12 shows another embodiment of a cable tensioning apparatus for use in the present invention. A base plate 118 is provided which is adapted to lie below the body portion 24 of the framing member 12. Thus, the base plate 118 will typically abut or be adjacent to the inner surface 120 of the body portion 24. On the base plate 118 there are located two cable wheels 122 and 124 with one end 96 of the cable 18 winding around the cable wheel 124 with the other end 98 of the cable 18 winding around the other cable wheel 122. Each cable wheel 122 and 124 incorporates a ratchet gear wheel 126 and 128 and a corresponding pawl 130 and 132. Associated with each pawl 130 and 132 is a pawl spring 134.

Typically, the body portion 24 of the framing member 12 will have holes therein corresponding to the position of the hub 136 of each wheel 122 and 124, and with the use of appropriate tools, extending through the hole, the cable wheels 122 and 124 can be turned to effect the necessary tightening and tensioning of the cable to securely hold the mounting frame 14 in the desired position.

Figure 13:
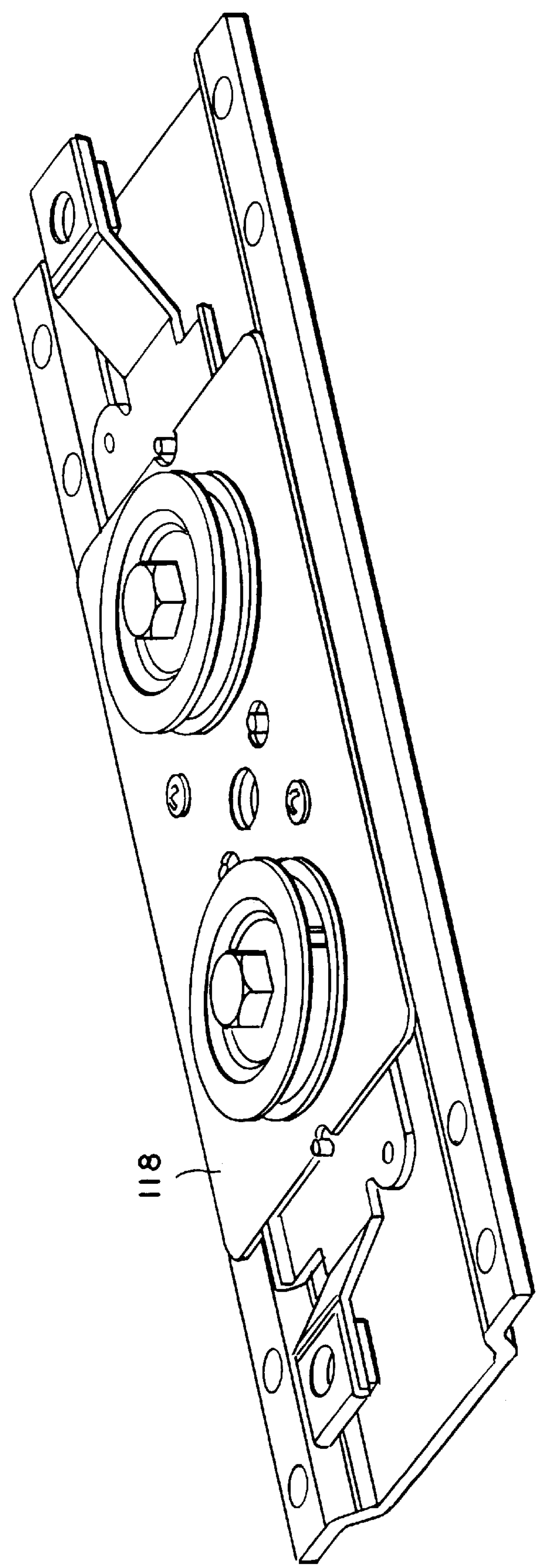
FIG. 13 is a second embodiment of the cable tensioning apparatus of the mounting system of the invention.

FIG. 13 shows yet another embodiment of a cable tensioning apparatus with conventional cable wheels which can be tightened to effect the necessary tension in the cable, and the wheels thereafter bolted securely to the base plate 118.

Figure 16:
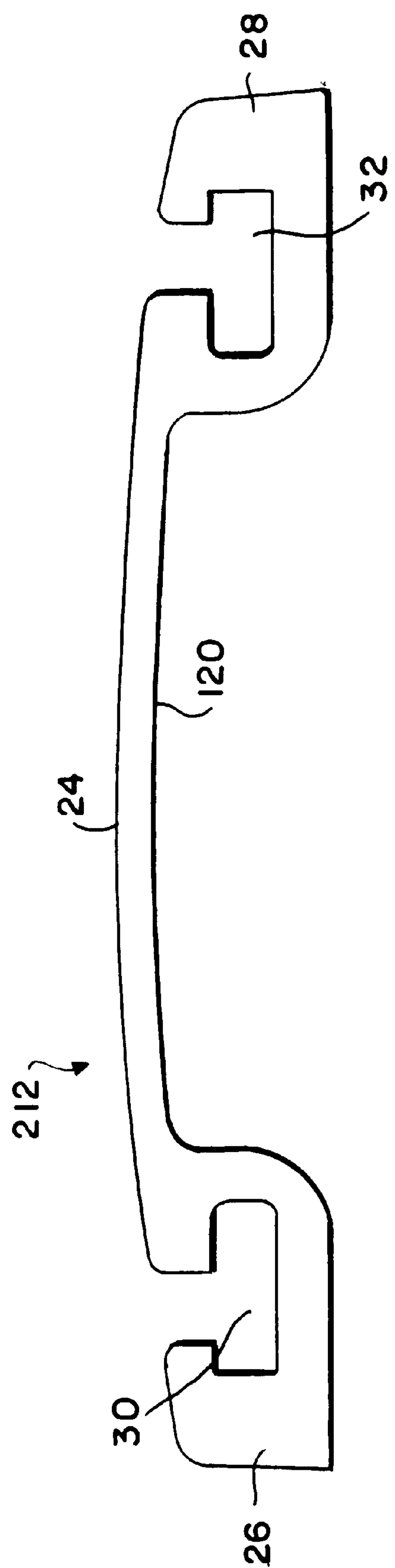
FIG. 16 shows second embodiment of a framing member of the invention.
Figure 17A:
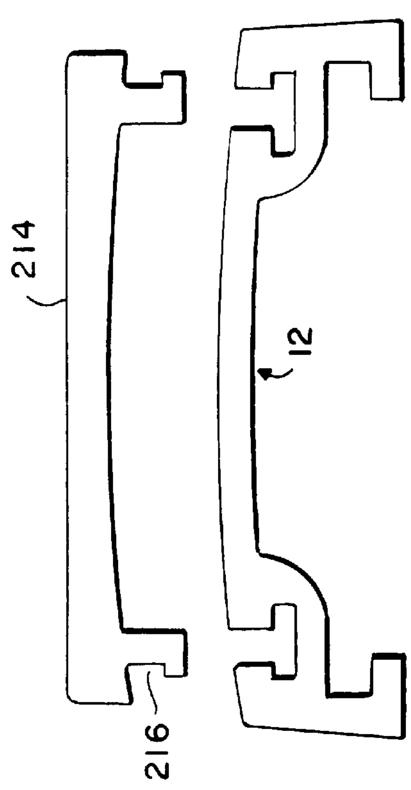
FIGS. 17*a* and 17*b* shows the framing member of FIG. 16 in conjunction with an adapter plate for use therewith.
Figure 17B:
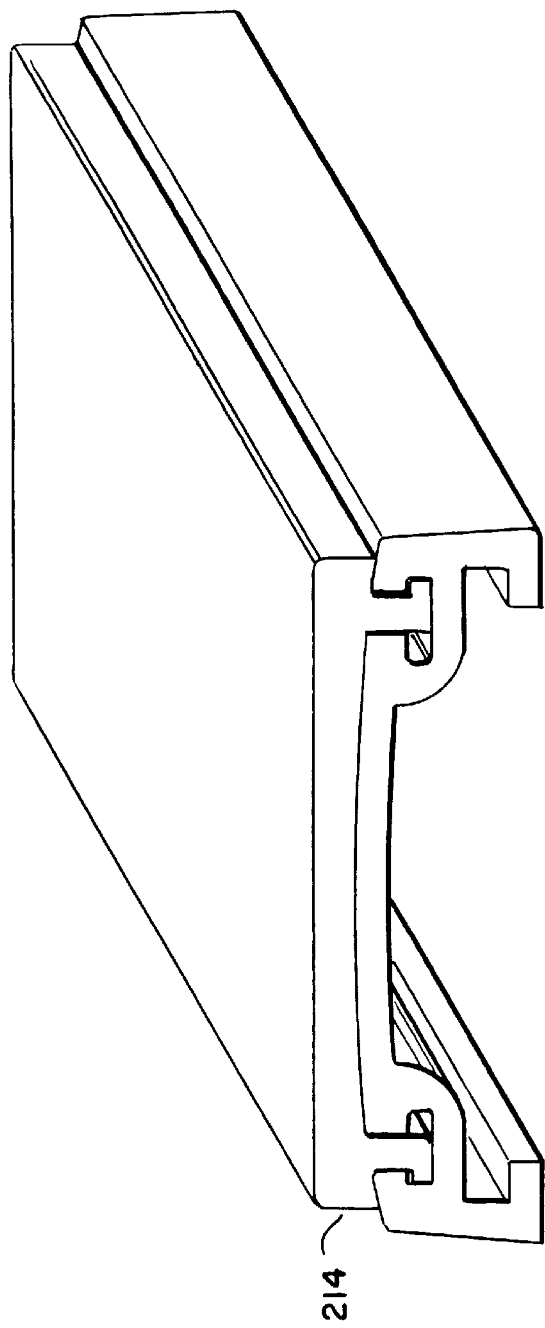

Turning now to FIG. 16, there is shown a second embodiment of a framing member 212, which is in all material aspects identical to the framing member 12 shown in FIGS. 1–3, except that the side walls 26 and 28 are shorter, and no flange 54 is provided. There will, of course, be no groove 56. A mounting member of the type shown in FIG. 16 may be used for a different mounting purpose. For example, an extended extrusion of the framing member 212 may be bolted to a wall, and an adapter plate 214 is structured so as to be received and slide within the T-shaped slots 30 and 32. Each adapter plate 214, an example of which is shown in FIGS. 17*a* and 17*b* of the drawings, has a pair of L-shaped projections 216 which are spaced and designed to slide freely in the continuous T-shaped slots 30 and 32. Each adapter plate 214 includes a fixing means which may comprise a bolt in a threaded hole. As the bolt is tightened, it will apply pressure to the body portion, thus fixing the adapter plate with respect to the body portion. The adapter plate is then available for use, and, depending on its shape and configuration, will either support or permit to be mounted desired objects.

Figure 15:
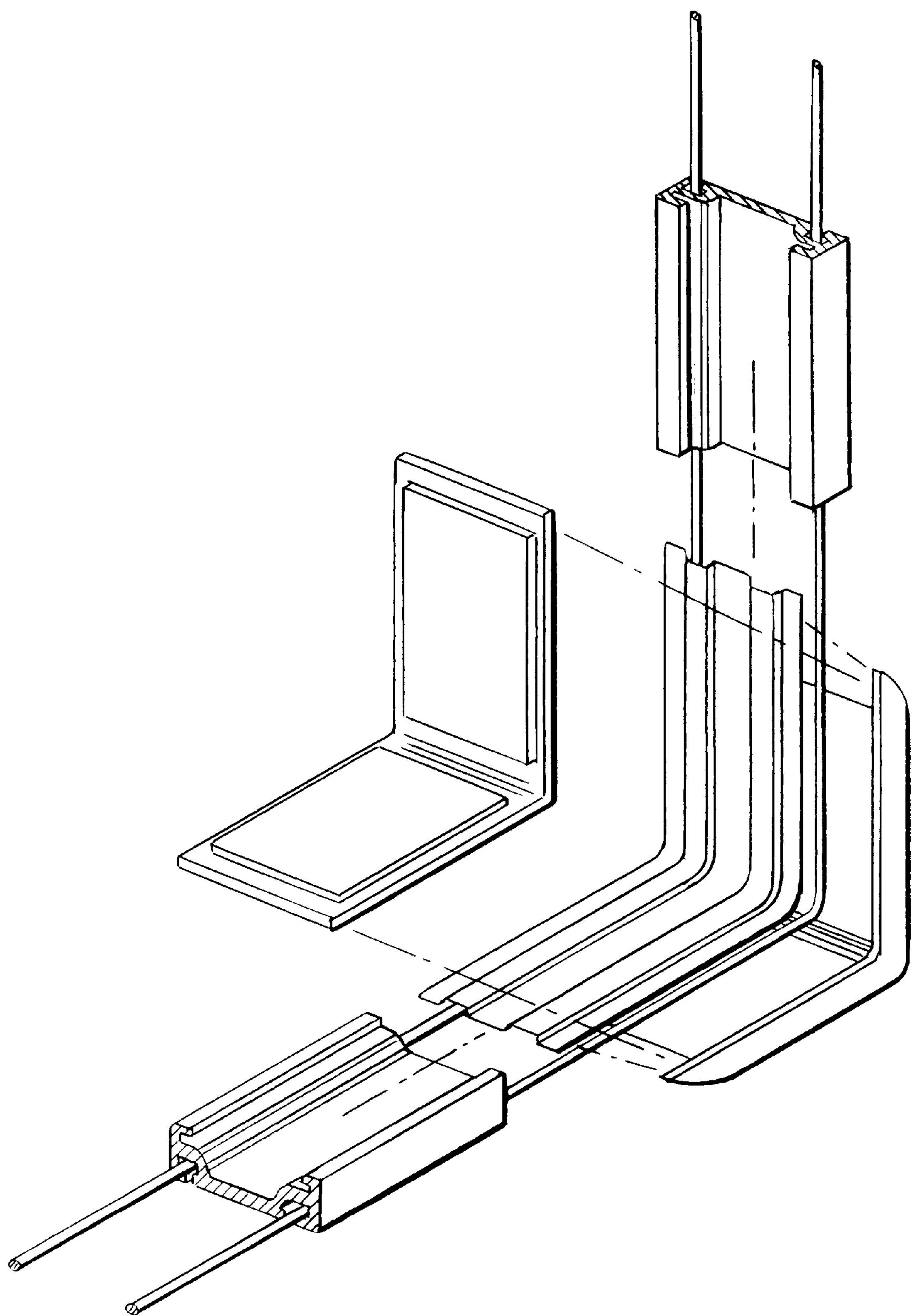
FIG. 15 is a detail of the corner arrangement of the mounting system shown in FIG. 14.

It may also be noted that the framing member 12 shown in FIGS. 1–3 is also capable of mounting on a wall so that an adapter plate 214 may slide within the T-shaped slots 230 and 232. Indeed, an advantage of mounting a framing member 12 of the type shown in FIGS. 1–3 against a wall is that the mounting pieces may be located behind the body portion, namely, between the body portion and the wall, and therefore not be visible when mounted. An adapter may therefore comprise a plate which slides in and is received in the continuous grooves 56, the plate being mounted to the wall. Once the plate is mounted to the wall, the framing member 12 is located over the plate, and one or more such plates may hold the framing member 12 in position. In such an arrangement, usually only one bolt is required through the body portion of the framing member, as opposed to two or more bolts, which may be visible, which are required when using a framing member 212 of the type shown in FIG. 15. The plate may be integrated as part of a die-cast and cap fitting that both dresses-down the end of framing member 12 and slides into the continuous grooves 56 of the framing member 12.

The apparatus for mounting an object, and the mounting system of the present invention, have a wide variety of applications and uses, as alluded to above. Thus, the framing member 12, in conjunction with connecting members 16 of different angle, can be used to create a frame of just about any size and shape, and therefore be easily adapted to mounting the object desired. As an example, the articles or objects which may be mounted by a system described in the present invention include computer monitors, television sets, cameras, VCRs, speakers, computers, printers, microwave ovens and a host of other electronic equipment. The components of the present invention additionally provide an aesthetically pleasing, low-profile frame which would, from a design point of view, enhance the appearance of a residential media center, home theaters or any other environment in which it is located. The invention has applications not only in residential media centers, home theaters but also with respect to commercial displays in retail outlets, positioning of electronic equipment in theaters, cinemas, broadcast and production facilities and corporate boardrooms and the like.

Once the mounting frame 14 has been properly located around an object, such as a television set, the mounting frame is attached to any suitable and/or conventional mounting system 138, as shown in FIG. 14 of the drawings. With desired mounting systems, which may comprise ball and socket connections or elbow joints, the frame, together with the object therein, can be attached to a wall, ceiling or floor so that its position is exactly as desired.

The system also has certain advantages particularly with respect to television sets and computer monitors. In this regard, the mounting frame 14 can be located about that portion of the object through which the center of gravity passes. When mounted in this way, the object will be relatively well "balanced" within the mounting frame, and therefore unnecessary load due to overbalancing or uncentered mounting can be avoided.

This system also provides a particularly secure connection with the object. The ability to design the frame to exactly fit the object to be mounted, the high coefficient of friction of the material in the cornerpiece 20 which is directly in contact with the object, all coupled with the ability to tension the cable to tighten the entire the mounting frame 14 to suit the circumstances, provide for an extremely secure and stable arrangement. Thus, the object mounted will not easily be displaced from the mounting frame by any unintentional knock or shaking, or any violent motion produced by an earthquake. The use of two fully independent cable systems in the mounting frame is an added safety feature since, if one cable were to become loose or otherwise fail in its ability to keep the mounting frame together, the other cable would still continue to function and essentially hold the mounting frame together.

The system is also exceptionally flexible in that objects mounted can be moved, for example, from one residence to another, without actually dismantling the mounting frame 14 from the object mounted. Rather, the object will remain in the frame, and the entire structure disengaged from the floor, wall or ceiling, so that when moving the system a minimal amount of deconstruction and reassembling is necessary.

The invention is not limited to the precise constructional details illustrated or described above. Thus, the framing member 12 may have a configuration or shape other than that described. For example, the body portion need not be arcuate, the continuous T-shaped slots may be of slightly different shape, with other small constructional changes. Moreover, any suitable means for fastening and/or tensioning the cable may be provided. Additionally, and where appropriate, the cornerpiece 20 may be omitted, or be incorporated into the framing member 12 and/or connecting piece 16 which may have extensions or projections for the purpose of frictionally engaging the object to be mounted.

I claim:

1. An apparatus for mounting an object, the apparatus comprising:

a plurality of elongated framing members each having a body portion with at least one slot therein;

a plurality of connecting members for connecting said plurality of framing members to each other, each of said plurality of connecting members having an associated cover; and a cable, the cable being concealed in the at least one slot of the framing members and being concealed by the covers associated with the connecting members, the cable being tightenable about a frame defined by the plurality of framing members and the plurality of connecting members and holding the plurality of framing members and the plurality of connecting members in place when tightened.

2. An apparatus as claimed in claim 1 wherein at least one of said framing members includes means for tightening the cable about the framing members and connecting members.

3. An apparatus as claimed in claim 2 wherein the means for tightening the cable includes a pair of pulley wheels, one wheel for each end of the cable, the pair of pulley wheels including ratchets, and the means for tightening including pawls associated with the ratchets.

4. An apparatus as claimed in claim 1 wherein the at least one slot in each of the framing members has a first portion which opens upon a surface of said framing members and a second portion which intersects said first portion at approximately a right angle.

5. An apparatus as claimed in claim 4 wherein said cable, at least when tightened, is disposed in a region of the second portions of the slots in said framing members remote from the first portions thereof.

6. An apparatus for mounting an object, the apparatus comprising:

a plurality of elongated framing members each having a body portion with at least one slot therein;

a plurality of connecting members for connecting said plurality of framing members to each other; and a cable, the cable being disposed in the at least one slot of the framing members, the cable being tightenable about a frame defined by the plurality of framing members and the plurality of connecting members and holding the plurality of framing members and the plurality of connecting members in place when tightened, the cable including tensioning means to permit minor elongation of the cable after the tensioning means has been tightened.

7. An apparatus as claimed in claim 6 wherein the tensioning means is a spring.

8. A mounting system for mounting an object, the system comprising:

a plurality of elongated framing members each having a body portion and depending side walls, with at least one slot in each one of said plurality of framing members, each one of said plurality of framing members having a pair of edges and an inwardly directed flange disposed along each one of said pair of edges, each flange and the body portion of the framing member defining a groove;

a plurality of connecting members for connecting adjacent framing members, the connecting members each having a first and second portion and lateral tongues on each of the first and second portions, the plurality of connecting members each having at least one trough adjacent one of said lateral tongues, the lateral tongues of the connecting member being received within the corresponding grooves of adjacent framing members so as to connect adjacent framing members at predetermined orientations;

a plurality of cornerpieces each having a first and second section at substantially right angles to each other, each of the cornerpieces having an inner and an outer surface with a rubber-like material located at least partially over the inner surface, each cornerpiece being located, in use, with its outer surface adjacent a corner connection between adjacent framing members and its inner surface with the rubber-like material adapted, in use, to engage the object to be mounted; and corner covers for connection to adjacent framing members to cover any exposed connecting member;

wherein the framing members and connecting members are slidably connected relative to each other so as to form a frame of desired shape and configuration, the mounting system further comprising at least one cable extending through the framing members and connecting members so as to hold said framing members and connecting members securely and firmly relative to each other, the at least one cable being located in the at least one continuous slot of the framing members and in the at least one trough in the connecting members, the at least one slot of each of the framing members being continuous and in registry with a corresponding trough in an adjacent one of said plurality of connecting members.

9. A mounting system as defined in claim 8 further comprising tensioning apparatus to facilitate proper tightening and tensioning of the at least one cable.

10. A mounting system as claimed in claim 8 wherein the at least one slot in the plurality of framing members has a first portion which opens upon a surface of said corresponding framing member and a second portion which intersects said first portion at approximately a right angle.

11. A mounting system as claimed in claim 10 wherein said at least one cable, at least when tightened, is disposed in a region of the second portions of the at least one slot in said plurality of framing members remote from the first portions thereof.

12. An apparatus for holding an object, the apparatus comprising:

a plurality of elongated, axial framing members each having a body portion extending along a major axis with at least one axial slot in said body portion;

a plurality of connecting pieces connecting adjacent elongated framing members in an essentially right angle configuration between the major axes thereof; and a cable, the cable being received in the at least one slot of the plurality of framing members, the cable being placed in tension to thereby hold the plurality of framing members and the plurality of connecting members about the object, wherein the cable includes a cable tightener to place the cable in tension about the object to be held and a cable tensioning apparatus to permit minor elongation of the cable after the cable has been placed in tension by said cable tightener.

13. An apparatus for holding an object, the apparatus comprising:

a plurality of elongated framing members each having a body portion with at least one slot therein;

a plurality of connecting pieces for connecting framing members to each other;

a cable, the cable being received in the at least one slot of the plurality of framing members, the cable being placed in tension to thereby hold the plurality of framing members and the plurality of connecting members about the object, the cable including:

a cable tightener for placing the cable in tension about the object to be held; and a tensioning apparatus to permit minor elongation of the cable after the cable has been placed in tension by said cable tightener.

14. An apparatus comprising:

a plurality of elongated framing members each having a body portion with first and second ends and with at least one slot in said body portion; and a cable, wherein the cable is placed in tension by a cable tightener and by a cable tensioning apparatus, the cable tensioning apparatus permitting minor elongation of the cable after the cable has been placed in tension by the cable tightener, the at least one slot in said plurality of framing members being sized to receive and conceal the cable, wherein the cable, when placed in tension in said at least one slot in said plurality of framing members, secures the framing members in a desired configuration wherein a first end of each of one of said plurality of framing members is disposed adjacent a second end of another one of said plurality of framing members.

* * * * *